(12) United States Patent
Byun et al.

(10) Patent No.: US 11,109,349 B2
(45) Date of Patent: *Aug. 31, 2021

(54) METHOD FOR TRANSMITTING A PAGING MESSAGE AND DEVICE SUPPORTING THE SAME

(71) Applicant: LG ELECTRONICS INC., Seoul (KR)

(72) Inventors: Daewook Byun, Seoul (KR); Jian Xu, Seoul (KR); Seokjung Kim, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/859,428

(22) Filed: Apr. 27, 2020

(65) Prior Publication Data

US 2020/0260410 A1  Aug. 13, 2020

Related U.S. Application Data

(63) Continuation of application No. 15/951,936, filed on Apr. 12, 2018, now Pat. No. 10,660,065.

(60) Provisional application No. 62/533,135, filed on Jul. 17, 2017, provisional application No. 62/484,901, filed on Apr. 13, 2017.

(51) Int. Cl.
| | |
|---|---|
| *H04W 68/02* | (2009.01) |
| *H04W 76/28* | (2018.01) |
| *H04W 88/16* | (2009.01) |
| *H04W 76/27* | (2018.01) |
| *H04W 88/08* | (2009.01) |

(52) U.S. Cl.
CPC .......... *H04W 68/02* (2013.01); *H04W 76/28* (2018.02); *H04W 88/16* (2013.01); *H04W 76/27* (2018.02); *H04W 88/085* (2013.01)

(58) Field of Classification Search
None
See application file for complete search history.

(56) References Cited

U.S. PATENT DOCUMENTS

| | | | |
|---|---|---|---|
| 2010/0165927 A1 | 7/2010 | Kim et al. | |
| 2013/0182677 A1* | 7/2013 | Frenger | H04W 68/005 370/329 |
| 2014/0098761 A1 | 4/2014 | Lee et al. | |
| 2018/0014218 A1 | 1/2018 | Kubota et al. | |
| 2018/0110082 A1 | 4/2018 | Saily et al. | |

(Continued)

*Primary Examiner* — Saba Tsegaye
(74) *Attorney, Agent, or Firm* — Birch, Stewart, Kolasch & Birch, LLP

(57) ABSTRACT

A method for a wireless device in a wireless communication system includes receiving a paging from a distribution unit (DU) of a base station; and upon receiving the paging message, initiating a service request procedure. Further, the paging is based on paging information transmitted from a central unit (CU) of the base station to the DU of the base station. The paging information includes paging discontinuous reception (DRX) information and paging priority information. The DU of the base station has a radio link control (RLC) layer, a media access control (MAC) layer and a physical layer of the base station. In addition, the CU of the base station has a radio resource control (RRC) layer, a service data adaptation protocol (SDAP) layer, and a packet data convergence protocol (PDCP) layer of the base station.

9 Claims, 11 Drawing Sheets

(56) References Cited

U.S. PATENT DOCUMENTS

2018/0206178 A1\* 7/2018 Tenny .................. H04W 48/12
2018/0213579 A1   7/2018 Hong et al.
2018/0234152 A1   8/2018 Miyamoto et al.

\* cited by examiner

METHOD FOR TRANSMITTING A PAGING MESSAGE AND DEVICE SUPPORTING THE SAME

CROSS-REFERENCE TO RELATED APPLICATIONS

This Application is a Continuation of co-pending U.S. patent application Ser. No. 15/951,936 filed on Apr. 12, 2018, which claims the priority benefit under 35 U.S.C. § 119(e) to U.S. Provisional Application Nos. 62/533,135 filed on Jul. 17, 2017 and 62/484,901 filed on Apr. 13, 2017, all of which are hereby expressly incorporated by reference into the present application.

BACKGROUND OF THE INVENTION

Field of the Invention

The present invention relates to a wireless communication system, and more particularly, to a method in which a distributed unit (DU) of a base station (BS) transmits a paging message to a user equipment (UE), and a device supporting the same.

Discussion of the Related Art

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, the base station (e.g., gNB) of NR may be divided into a central unit and a distributed unit. That is, the gNBs can be hierarchically separated and operated. The central unit may perform the functions of the upper layers of the base station, and the distributed unit may perform the functions of the lower layers of the base station. Because the Paging message received from the Core Network (CN) can be interpreted at the RRC layer in the CU but transmission of the paging is possible in the DU through the radio, the signaling between the CU and the DU is necessary.

SUMMARY OF THE INVENTION

According to a prior art, there is no procedure for performing the paging in case of CU-DU split.

According to one embodiment of the present invention, a method for transmitting a paging message in a wireless communication system includes: receiving a paging information from a Central Unit (CU) of the base station; and transmitting the paging message based on the paging information to a User Equipment (UE), wherein the DU is a lower layer of the base station, and the CU is a higher layer of the base station.

The CU includes a radio resource control (RRC) layer and a packet data convergence protocol (PDCP) layer of the base station, and wherein the DU includes a radio link control (RLC) layer, a medium access control (MAC) layer and a physical (PHY) layer of the base station.

The paging information may include at least one of UE Identity Index Value, UE Paging Identity, Paging Discontinuous Reception (DRX), List of tracking area identities (TAIs), Paging Priority, UE Radio Capability for Paging, Assistance Data for Paging, Paging eDRX Information and Extended UE Identity Index Value.

The method may further comprise receiving a paging message generated by a radio resource control (RRC) layer of the CU.

The method may further comprise transmitting a paging record indication based on the paging information.

The paging record indication may include UE identity, paging frame (PF) and paging occasion (PO).

The method may further comprise receiving the paging message from the CU corresponding the PO and the PF by a container.

The paging message includes a paging record list to page multiple UEs.

According to another embodiment of the present invention, a Distributed Unit (DU) of a base station in a wireless communication system includes: a memory; a transceiver for transmitting or receiving a radio signal; and a processor coupled to the transceiver, wherein the processor configured to: receive a paging information from a Central Unit (CU) of the base station; and transmit a paging message based on the paging information to a User Equipment (UE), wherein the DU is a lower layer of the base station, and the CU is a higher layer of the base station.

The CU includes a radio resource control (RRC) layer and a packet data convergence protocol (PDCP) layer of the base station, and wherein the DU includes a radio link control (RLC) layer, a medium access control (MAC) layer and a physical (PHY) layer of the base station.

The paging information may include at least one of UE Identity Index Value, UE Paging Identity, Paging Discontinuous Reception (DRX), List of tracking area identities (TAIs), Paging Priority, UE Radio Capability for Paging, Assistance Data for Paging, Paging eDRX Information and Extended UE Identity Index Value.

The processor may be further configured to receive a paging message generated by a radio resource control (RRC) layer of the CU.

The processor may be further configured to transmit a paging record indication based on the paging information.

The paging record indication may include UE identity, paging frame (PF) and paging occasion (PO).

The processor may be further configured to receive the paging message from the CU corresponding the PO and the PF by a container.

DETAILED DESCRIPTION OF THE EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
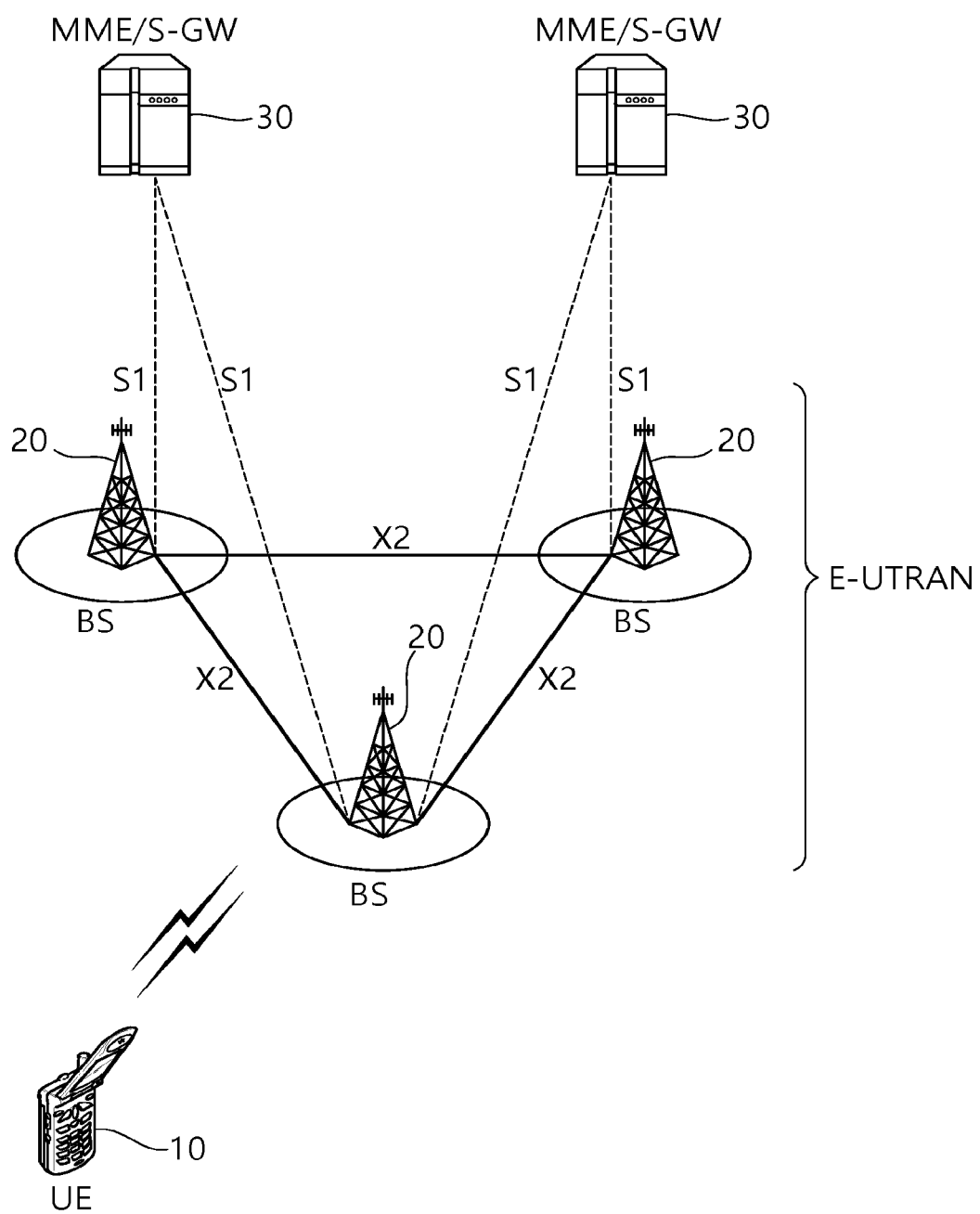
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN may include at least one evolved node-B (eNB) 20, and a plurality of UEs may be present in one cell. An E-UTRAN system is a system evolved from the existing UTRAN system, and may be, for example, a 3GPP LTE/LTE-A system. The E-UTRAN consists of base stations (BSs) (or eNBs) which provide the UE with control plane and user plane protocols, and the BSs are connected through an X2 interface. An X2 user plane (X2-U) interface is defined between the BSs. The X2-U interface provides non-guaranteed delivery of a user plane packet data unit (PDU). An X2 control plane (X2-CP) interface is defined between two neighboring BSs. The X2-CP performs a function of context delivery between BSs, user plane tunnel control between a source BS and a target BS, handover-related message delivery, uplink load management, or the like. The BS is connected to the UE through a radio interface, and is connected to an evolved packet core (EPC) through an S1 interface. An S1 user plane (S1-U) interface is defined between the BS and a serving gateway (S-GW). An S1 control plane (S1-MME) interface is defined between the BS and a mobility management entity (MME). The S1 interface performs an evolved packet system (EPS) bearer service management function, a non-access stratum (NAS) signaling transport function, network sharing, an MME load balancing function, or the like. The S1 interface supports a many-to-many relation between the BS and the MME/S-GW.

The eNB 20 provides the UE with end points of the control plane and the user plane. The eNB 20 is generally a fixed station that communicates with the UE 10 and may be referred to as another terminology, such as a base station (BS), a base transceiver system (BTS), an access point, or the like. One eNB 20 may be arranged in every cell. At least one cell may be present in a coverage of the eNB 20. One cell is configured to have one of bandwidths selected from 1.25, 2.5, 5, 10, and 20 MHz, etc., and provides downlink (DL) or uplink (UL) transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
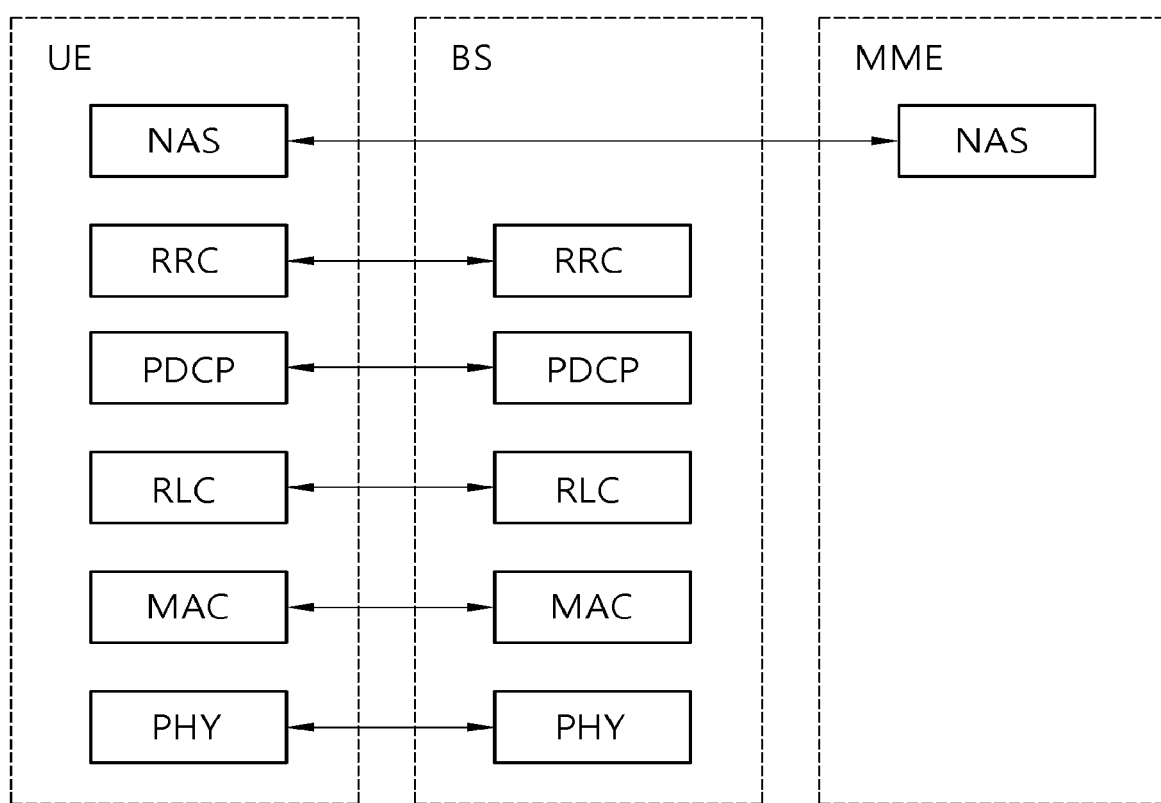
FIG. 2 shows a block diagram of a control plane protocol stack of an LTE system.
Figure 3:
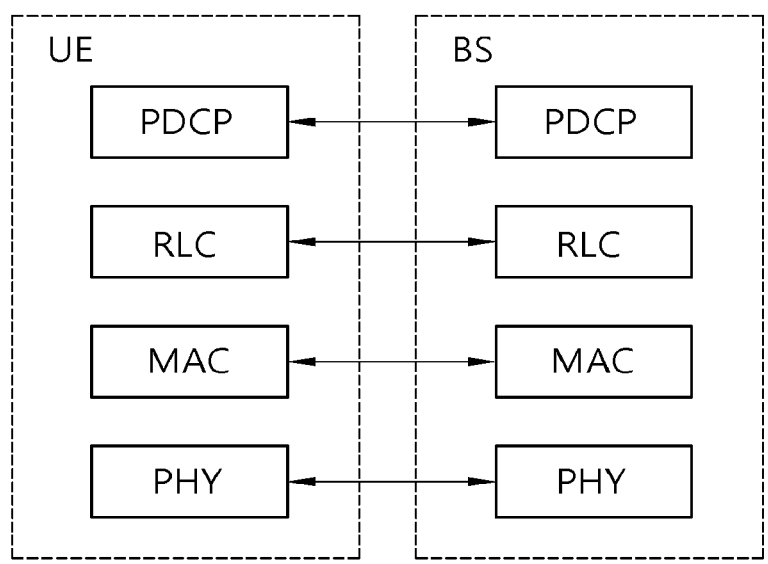
FIG. 3 shows a block diagram of a user plane protocol stack of an LTE system.

FIG. 2 shows a block diagram of a control plane protocol stack of an LTE system, and FIG. 3 shows a block diagram of a user plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer above the RRC layer performs functions, such as session management and mobility management.

Hereinafter, a 5G network structure is described.

Figure 4:
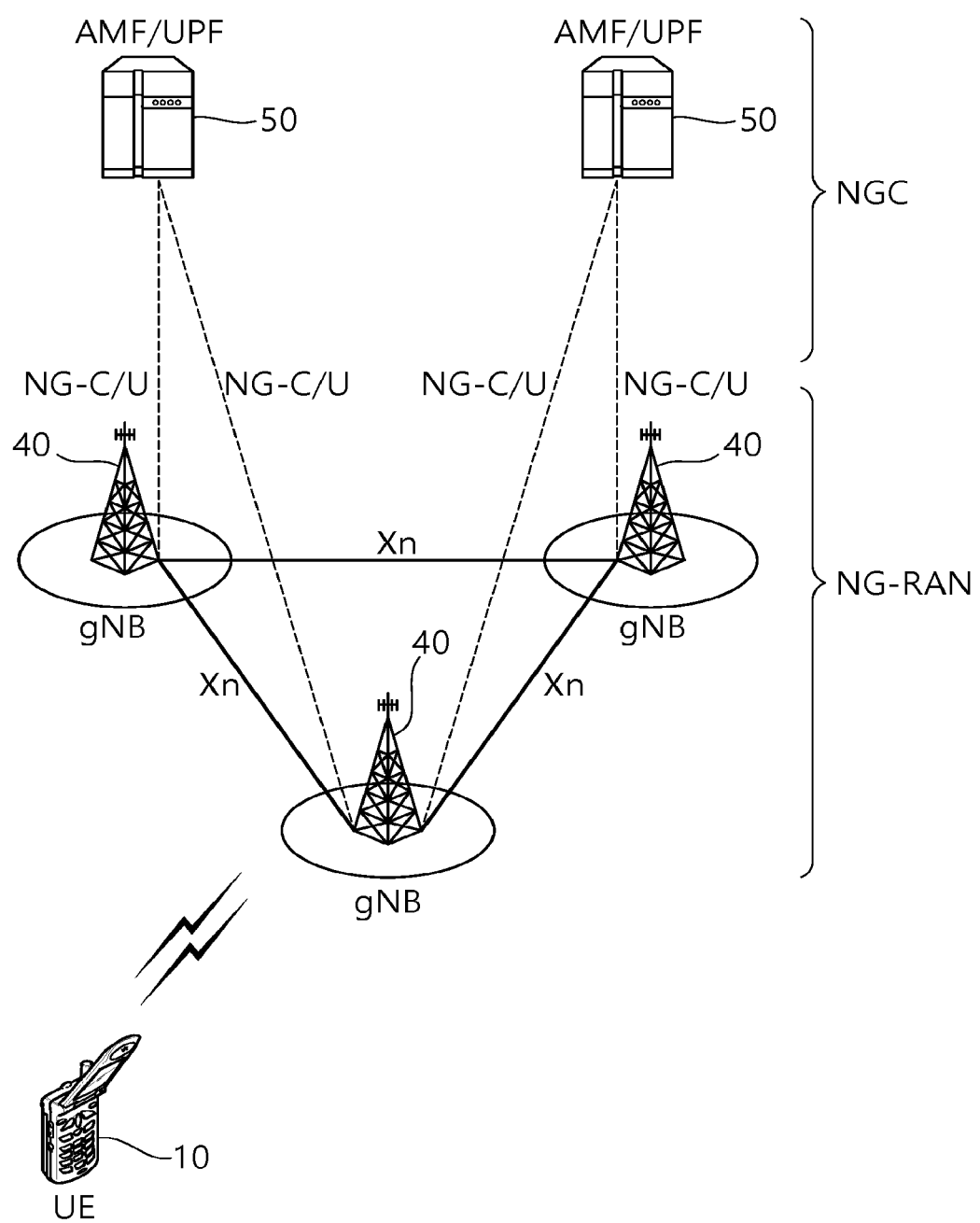
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NGC interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signaling termination, NAS signaling security, AS security control, inter CN node signaling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on the NR standardization, an RRC_INACTIVE state (RRC inactive state) has been newly introduced in addition to the existing RRC_CONNETED state and RRC_IDLE state. The RRC_INACTIVE state may be a concept similar to a lightly connected mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

Figure 5:
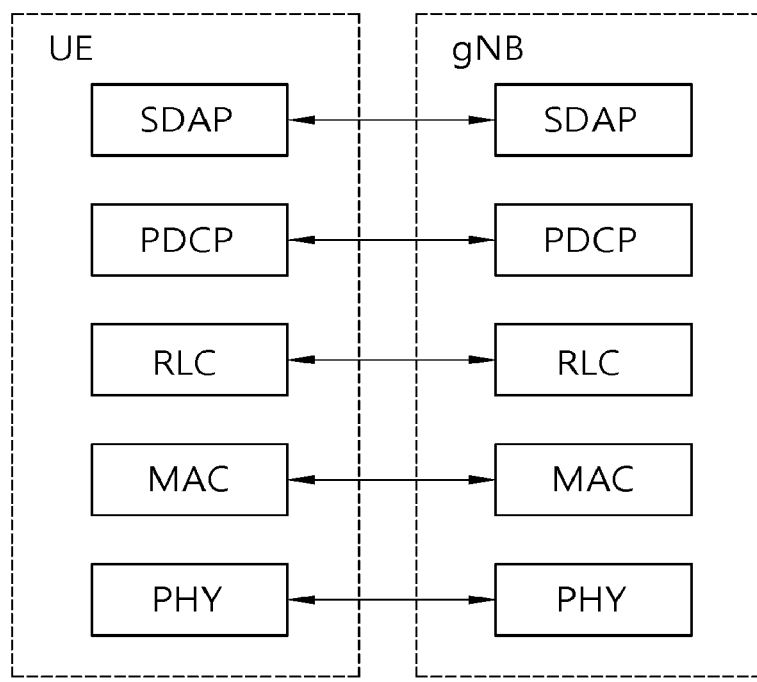
FIG. 5 shows the radio interface protocol for the user plane of the 5G system.

FIG. 5 shows the radio interface protocol for the user plane of the 5G system.

Referring to FIG. 5, the radio interface protocol of the 5G system with respect to the user plane may include a new layer called Service Data Adaptation Protocol (SDAP) as compared with the LTE system. The main services and functions of the SDAP layer are the mapping between the Quality of Service (QoS) flow and the data radio bearer (DRB), and the QoS flow ID (QFI) marking in both DL and UL packets. The single protocol entity of the SDAP can be configured for each individual PDU session, except for the DC (dual connectivity) where two entities can be configured.

Hereinafter, a 5G RAN deployment scenario is described.

The 5G RAN can be classified into a non-centralized deployment scenario, a co-deployed deployment scenario (E-UTRA), and a co-located deployment scenario according to the way in which the base station functions are arranged in a central unit and a distributed unit and a centralized deployment scenario and depending on coexistence with the 4G base station. In this specification, 5G RAN, gNB, Next Generation Node B, New RAN, and NR BS (New Radio Base Station) may mean a newly defined base station for 5G.

Figure 6:
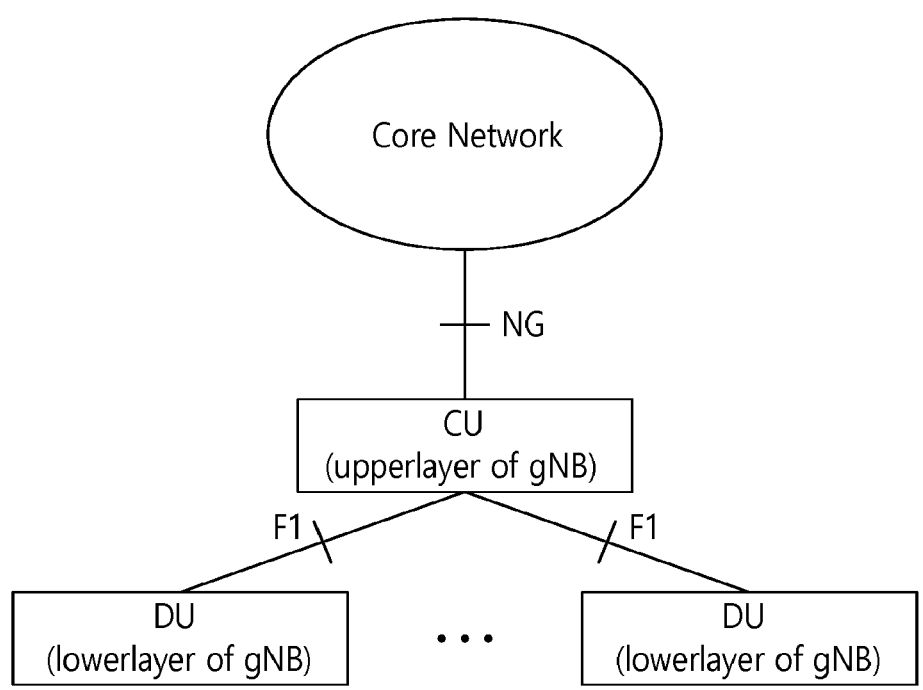
FIG. 6 illustrates a Centralized Deployment scenario.

FIG. 6 illustrates a Centralized Deployment scenario.

Referring to FIG. 6, the gNB may be divided into a central unit and a distributed unit. That is, the gNBs can be hierarchically separated and operated. The central unit may perform the functions of the upper layers of the base station, and the distributed unit may perform the functions of the lower layers of the base station.

Figure 7:
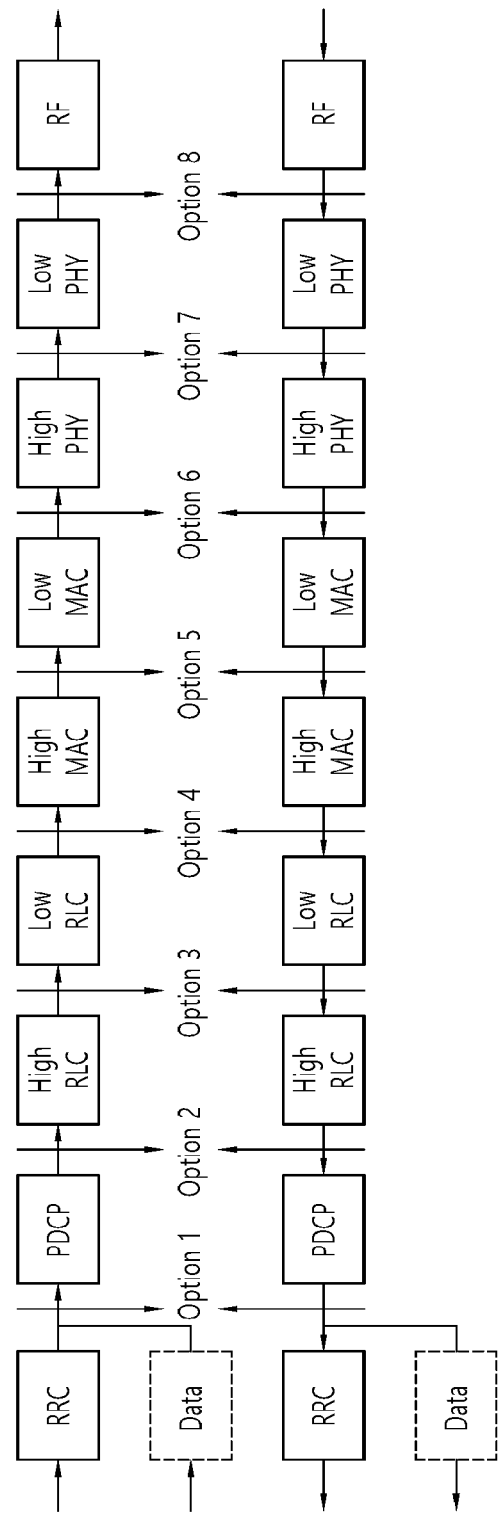
FIG. 7 shows a functional split between a central unit and a distributed unit in a separate base station deployment scenario.

FIG. 7 shows a functional split between a central unit and a distributed unit in a separate base station deployment scenario.

Referring to FIG. 7, in the case of Option 1, the RRC layer is in the central unit, and the PDCP layer, RLC layer, MAC layer, physical layer, and RF are in the distributed unit. In Option 2, the RRC layer and the PDCP layer are in the central unit, and the RLC layer, MAC layer, physical layer, and RF are in the distributed unit. In Option 3, the RRC layer, the PDCP layer and the RLC upper layer are in the central unit, and the RLC lower layer, MAC layer, physical layer, and RF are in the distributed unit. In option 4, the RRC layer, the PDCP layer and the RLC layer are in the central unit, and the MAC layer, physical layer and RF are in the distributed unit. In option 5, the RRC layer, the PDCP layer, the RLC layer and the MAC upper layer are in the central unit, and the MAC lower layer, physical layer and RF are in the distributed unit. In Option 6, the RRC layer, PDCP layer, RLC layer and MAC layer are in the central unit, and the physical layer and RF are in the distributed unit. In Option 7, the RRC layer, the PDCP layer, the RLC layer, the MAC layer, and the upper physical layer are in the central unit, and the lower physical layer and RF are in the distributed unit. In option 8, the RRC layer, the PDCP layer, the RLC layer, the MAC layer, and the physical layer are in the central unit and the RF is in the distributed unit.

Hereinafter, in this specification, the central unit may be referred to as a CU, and the distributed unit may be referred to as DU. The CU may be a logical node that hosts the radio resource control (RRC), service data adaptation protocol (SDAP) and packet data convergence protocol (PDCP) layers of the gNB, DU may be a logical node that hosts a radio link control (RLC), Media access control (MAC), and physical (PHY) layer. Alternatively, the CU may be a logical node hosting the RRC and PDCP layers of the en-gNB. That is, Option 2 in FIG. 7 described above is assumed in this specification.

Because the Paging message received from the Core Network (CN) can be interpreted at the RRC layer in the CU but transmission of the paging is possible in the DU through the radio, the signaling between the CU and the DU is necessary. There is no procedure for performing the paging in case of CU-DU split. In other words, the CU can interpret the Paging message received from the CN due to having the RRC layer, while it cannot page the UE directly due to not having the PHY layer. Thus, in order to page the UE, the signaling between the CU and DU is necessary. However, there is no procedure for performing the paging in case of CU-DU split. Therefore, the solution for this paging is needed.

Hereinafter, a method for transmitting a paging message according to an embodiment of the present invention is described.

Figure 8:
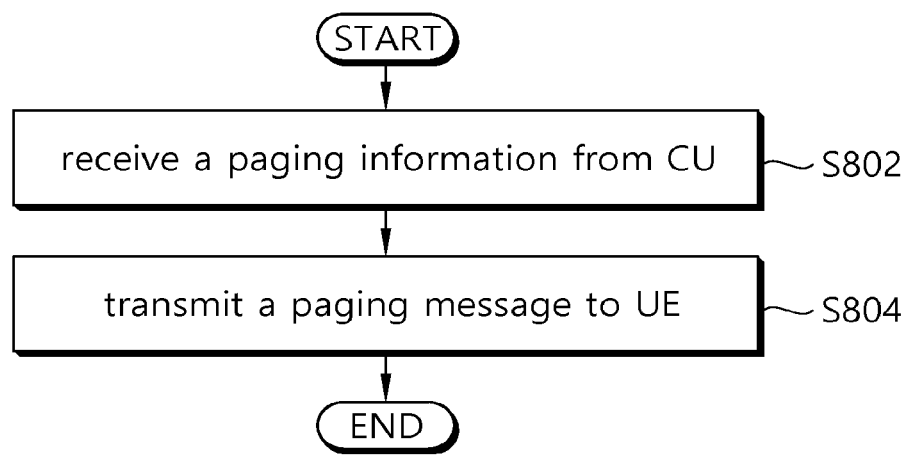
FIG. 8 shows an example of a method for transmitting a paging message according to an embodiment of the present invention.

FIG. 8 shows an example of a method for transmitting a paging message according to an embodiment of the present invention.

In step S802, the DU receives a paging information from a Central Unit (CU) of the base station. The CU includes a radio resource control (RRC) layer and a packet data convergence protocol (PDCP) layer of the base station, and wherein the DU includes a radio link control (RLC) layer, a medium access control (MAC) layer and a physical (PHY) layer of the base station. The paging information includes at least one of UE Identity Index Value, UE Paging Identity, Paging Discontinuous Reception (DRX), List of tracking area identities (TAIs), Paging Priority, UE Radio Capability for Paging, Assistance Data for Paging, Paging eDRX Information and Extended UE Identity Index Value. The DU receives a paging message generated by a radio resource control (RRC) layer of the CU. The DU may be further configured to transmit a paging record indication based on the paging information. The paging record indication includes UE identity, paging frame (PF) and paging occasion (PO). The DU may be further configured to receive the paging message from the CU corresponding the PO and the PF by a container. The paging message includes a paging record list to page multiple UEs.

In step S804, the DU transmits the paging message based on the paging information to a User Equipment (UE).

Figure 9:
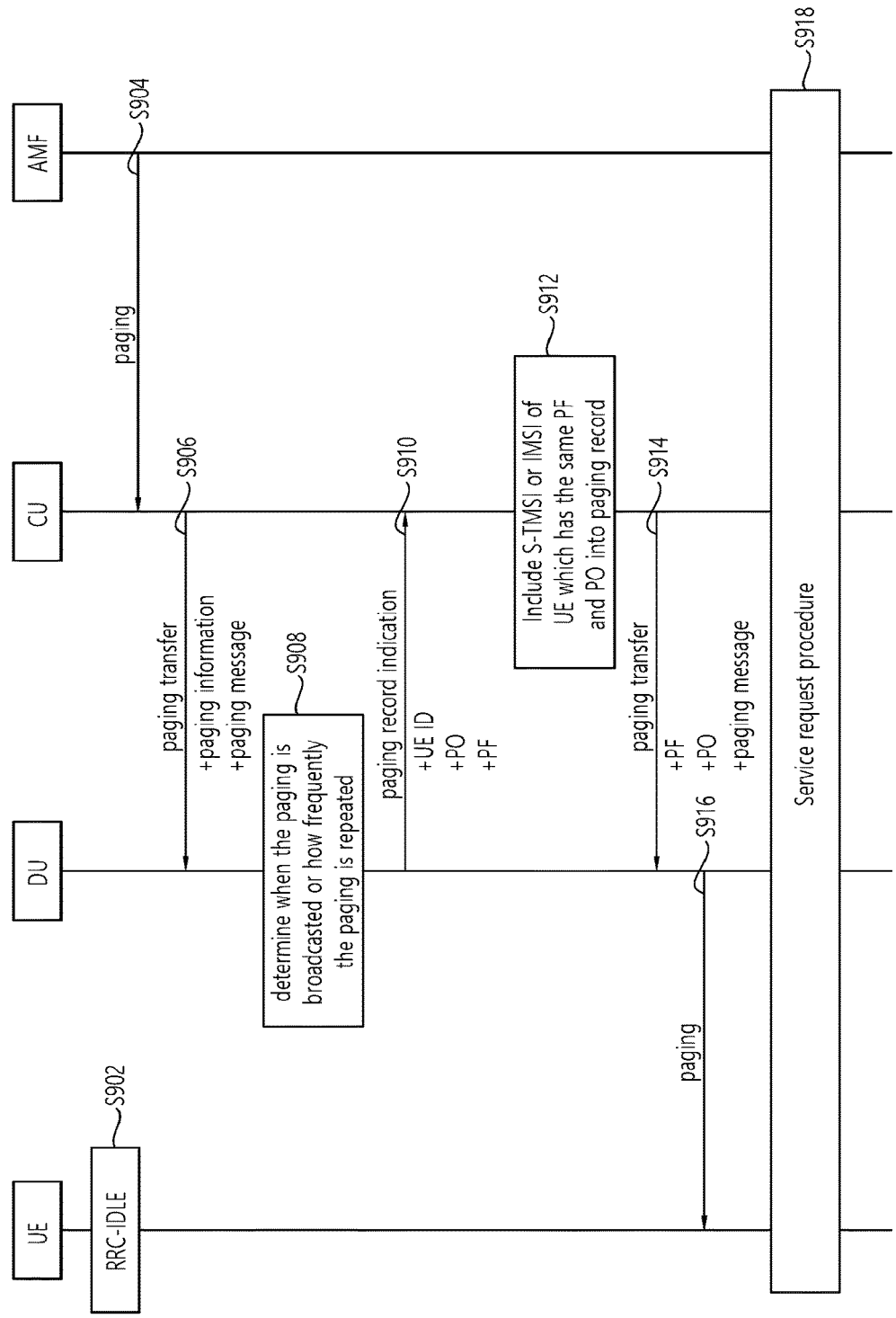
FIG. 9 is a flowchart illustrating a method of transmitting a paging message according to an embodiment of the present invention.

FIG. 9 is a flowchart illustrating a method of transmitting a paging message according to an embodiment of the present invention.

Referring to FIG. 9, according to an embodiment of present invention, the CU transmits the paging message generated by the RRC layer and the information included into the paging message received from the AMF as it is to the DU which should perform the paging, and then the DU determines how to perform the paging.

In Step S902, the UE is in RRC_IDLE state.

In Step S904, the AMF sends the paging message to the CU.

In Step S906, on receiving the paging message, based on the information included into the message, the CU determines which DU performs the paging. And then, it sends the paging transfer or new message including the paging information to the DU which should perform the paging. The paging information may include the followings:
 UE Identity Index Value
 UE Paging Identity
 Paging DRX
 List of TAIs
 Paging Priority
 UE Radio Capability for Paging
 Assistance Data for Paging
 Paging eDRX Information
 Extended UE Identity Index Value Also, the paging transfer or new message may include the paging message generated by the RRC layer. Further, paging DRX may be included in the paging message, and the DU may use the paging DRX to determine the final paging cycle for the UE. Further, the paging priority may be included in the paging message, and the DU may use the paging priority to page one or more UEs. That is, the DU may determine several conditions for paging UE, such as paging cycle, based on the paging information. In order to forward this paging message to the DU, a container may be used.

In Step S908, upon receipt of the paging transfer or new message, based on the paging information, the DU decides when the paging is broadcasted or how frequently the paging is repeated or which level of power is necessary to transmit the paging.

In Step S910, if the paging frame (PF) and paging occasion (PO) which the DU calculates for the UE are the same ones of other UE(s), the DU may transmit to the CU the paging record indication or new message including the UE identity (e.g., S-TMSI or IMSI), the PF, and the PO to be able to page multiple UEs. Also, in this case, the DU may ignore the paging message received from the CU in Step S906.

On the other hand, one paging occasion (PO) is a subframe where there may be P-RNTI transmitted on PDCCH or MPDCCH or, for NB-IoT on NPDCCH addressing the paging message. In P-RNTI transmitted on MPDCCH case, PO refers to the starting subframe of MPDCCH repetitions. In case of P-RNTI transmitted on NPDCCH, PO refers to the starting subframe of NPDCCH repetitions unless subframe determined by PO is not a valid NB-IoT downlink subframe then the first valid NB-IoT downlink subframe after PO is the starting subframe of the NPDCCH repetitions.

One paging frame (PF) is one Radio Frame, which may contain one or multiple Paging Occasion(s). When DRX is used the UE needs only to monitor one PO per DRX cycle. PF, PO, and PNB are determined by following formulae using the DRX parameters provided in System Information:
 PF is given by following equation:

$$\text{SFN mod } T = (T \text{ div } N)*(\text{UE\_ID mod } N)$$

In Step S912, on receiving the message from the DU, the CU may generate the paging message including the paging record list to page multiple UEs which have the same PF and PO. That is, the received UE identity (e.g., S-TMSI or IMSI) is contained into the paging record list corresponding to the received PF and PO. If there is no paging record list corresponding to the received PF and PO, the CU may create the paging record list.

In Step S914, The CU sends to the DU the paging transfer or new message including the PF, the PO and the paging message. This paging message may contain the paging record list corresponding to the transmitted PF and PO and may be piggybacked by a container.

On the other hand, Steps S910~S914 may be skipped according on embodiments.

In Step S916, The DU pages the UE indicated in the paging record list.

In Step S918, on receiving the paging message, the UE initiates the UE triggered Service Request procedure.

With this embodiment of present invention, the DU which should perform the paging can manage the paging and page the UE considering the radio condition and/or radio resources.

Figure 10:
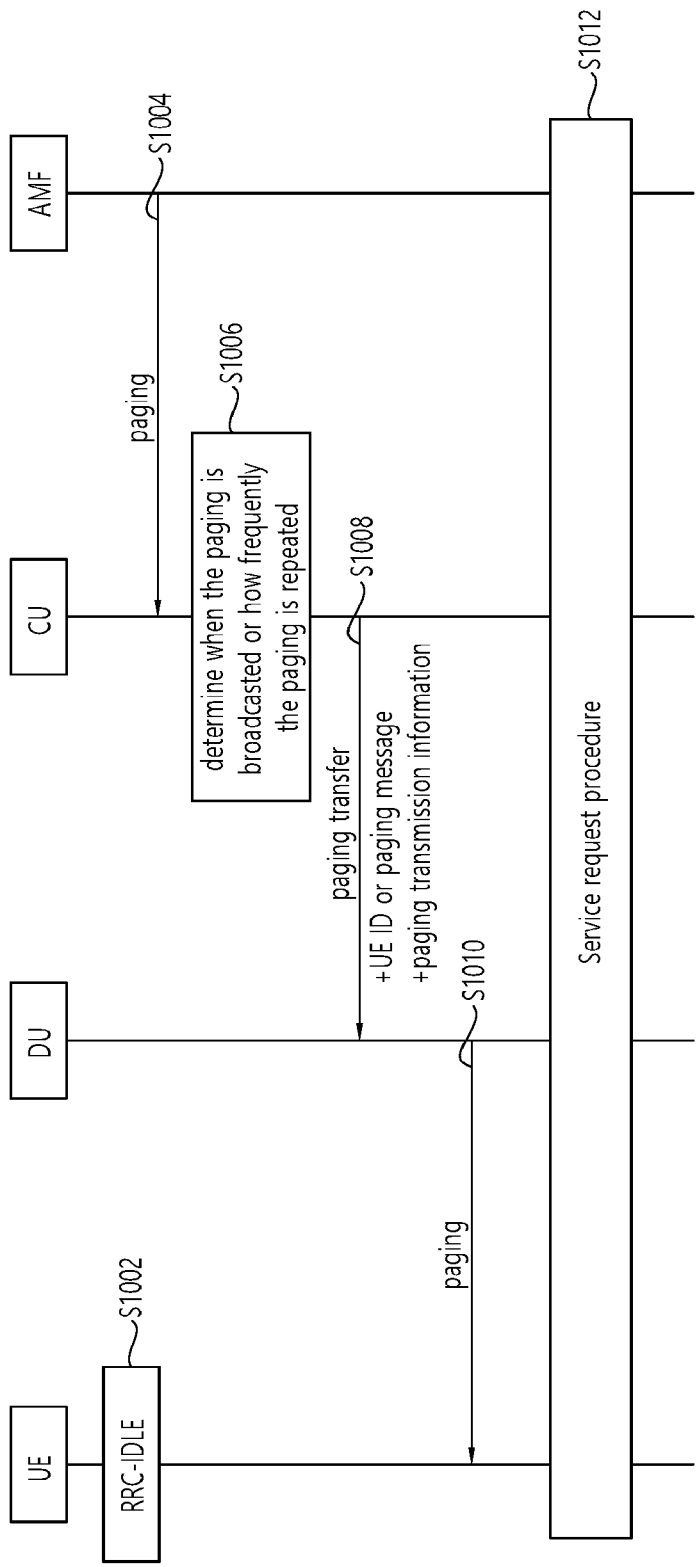
FIG. 10 is a flowchart illustrating a method of transmitting a paging message according to another embodiment of the present invention.

FIG. 10 is a flowchart illustrating a method of transmitting a paging message according to another embodiment of the present invention.

Referring to FIG. 10, according to an embodiment of present invention, after the CU determines how to perform the paging and the information needed to perform the paging, it sends this information and the UE ID or the paging message generated by the RRC layer to the DU which should perform the paging.

In Step S1002, the UE is in RRC_IDLE state.

In Step S1004, The AMF sends the paging message to the CU.

In Step S1006, on receiving the paging message, based on the information included into the message, the CU determines when the paging is broadcasted or how frequently the paging is repeated or which level of power is necessary to transmit the paging or which DU performs the paging.

In Step S1008, the CU transmits to the DU the Paging Transfer or new message including the UE ID or the paging message generated by the RRC layer, and the paging transmission information. The paging transmission information may contain the followings:
  Paging Frame (PF)
  Paging Occasion (PO)
  Paging Time Window (PTW)
  Paging repetition/attempt number
  Paging transmission power level
  System Frame Number (SFN)

The paging message may be piggybacked by a container to the DU.

In Step S1010, upon receipt of the message from the CU, the DU pages the UE based on the paging transmission information.

In Step S1012, on receiving the paging message, the UE initiates the UE triggered Service Request procedure.

With this another embodiment of present invention, the CU can manage the paging received from the AMF and provide the DU which should perform the paging with the information needed to perform the paging. This embodiment of the present invention can reduce the number of information elements offered by the signaling between the CU and the DU.

In this invention, the CU or the DU can manage the paging. In case the CU manages the paging, it can provide to the DU with the information needed to perform the paging. In case the DU manage the paging, it can page the UE considering the radio condition and/or radio resources.

Figure 11:
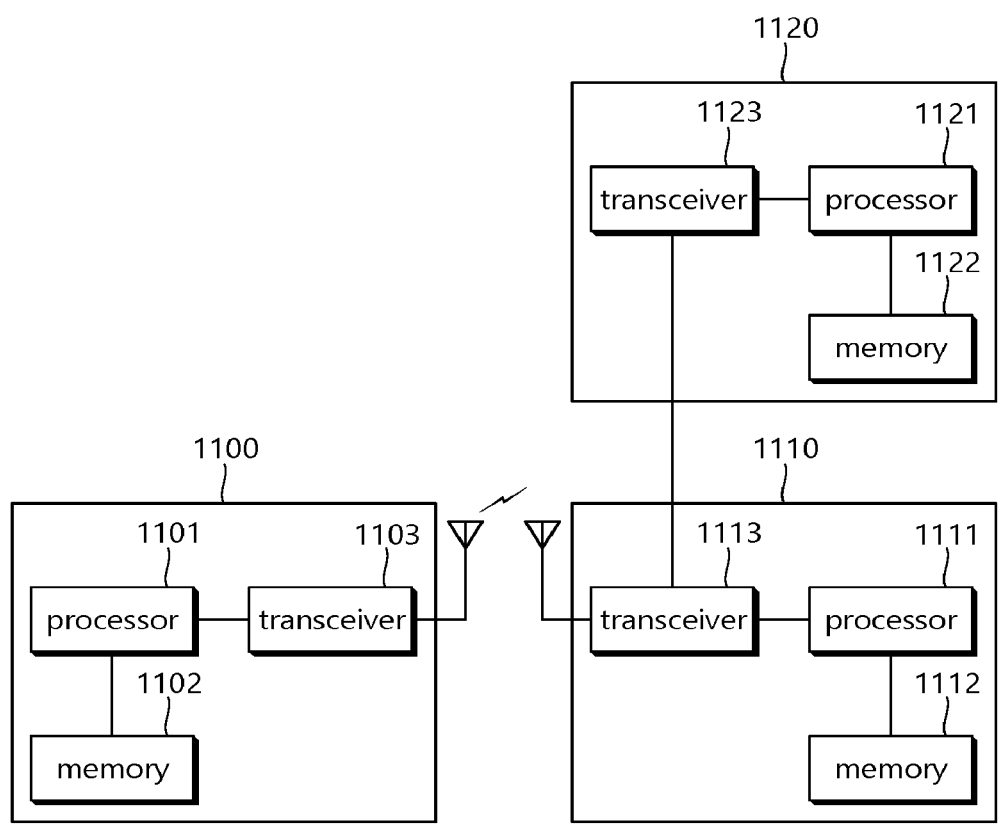
FIG. 11 shows a communication system to implement an embodiment of the present invention.

FIG. 11 shows a communication system to implement an embodiment of the present invention.

A first network node 1100 includes a processor 1101, a memory 1102, and a transceiver 1103. The memory 1102 is coupled to the processor 1101, and stores a variety of information for driving the processor 1101. The transceiver 1103 is coupled to the processor 1101, and transmits and/or receives a radio signal. The processor 1101 implements the proposed functions, procedures, and/or methods. In the aforementioned embodiments, an operation of the first network node may be implemented by the processor 1101.

A second network node 1110 includes a processor 1111, a memory 1112, and a transceiver 1113. The memory 1112 is coupled to the processor 1111, and stores a variety of information for driving the processor 1111. The transceiver 1113 is coupled to the processor 1111, and transmits and/or receives a radio signal. The processor 1111 implements the proposed functions, procedures, and/or methods. In the aforementioned embodiments, an operation of the second network node 1110 may be implemented by the processor 1111.

The processors 1111 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for a wireless device in a wireless communication system, the method comprising:
   receiving a paging from a distribution unit (DU) of a base station; and
   upon receiving the paging, initiating a service request procedure,
   wherein the paging is based on paging information transmitted from a central unit (CU) of the base station to the DU of the base station,
   wherein the paging information includes paging discontinuous reception (DRX) information and paging priority information,
   wherein the DU of the base station has a radio link control (RLC) layer, a media access control (MAC) layer and a physical layer of the base station, and
   wherein the CU of the base station has a radio resource control (RRC) layer, a service data adaptation protocol (SDAP) layer, and a packet data convergence protocol (PDCP) layer of the base station.

2. The method of claim 1, wherein a cycle of the paging is determined based on the paging DRX information.

3. The method of claim 1, wherein the paging information further includes at least one of a user equipment (UE) identity index value, a UE paging identity, a list of tracking area identities (TAIs), UE radio capability for paging, assistance data for paging and/or an extended UE identity index value.

4. A wireless device in a wireless communication system, the wireless device comprising:
   at least one transceiver;
   at least processor; and
   at least one computer memory operably connectable to the at least one processor and storing instructions that, based on being executed by the at least one processor, perform operations comprising:

receiving a paging from a distribution unit (DU) of a base station; and upon receiving the paging, initiating a service request procedure, wherein the paging is based on paging information transmitted from a central unit (CU) of the base station to the DU of the base station, wherein the paging information includes paging discontinuous reception (DRX) information and paging priority information, wherein the DU of the base station has a radio link control (RLC) layer, a media access control (MAC) layer and a physical layer of the base station, and wherein the CU of the base station has a radio resource control (RRC) layer, a service data adaptation protocol (SDAP) layer, and a packet data convergence protocol (PDCP) layer of the base station.

5. The wireless device of claim 4, wherein a cycle of the paging is determined based on the paging DRX information.

6. The wireless device of claim 4, wherein the paging information further includes at least one of a user equipment (UE) identity index value, a UE paging identity, a list of tracking area identities (TAIs), UE radio capability for paging, assistance data for paging and/or an extended UE identity index value.

7. A wireless device in a wireless communication system, the wireless device comprising:

a processor; and a memory coupled to the processor, wherein the processor is configured to:

obtain a paging from a distribution unit (DU) of a base station; and upon obtaining the paging, initiate a service request procedure, wherein the paging is based on paging information transmitted from a central unit (CU) of the base station to the DU of the base station, wherein the paging information includes paging discontinuous reception (DRX) information and paging priority information, wherein the DU of the base station has a radio link control (RLC) layer, a media access control (MAC) layer and a physical layer of the base station, and wherein the CU of the base station has a radio resource control (RRC) layer, a service data adaptation protocol (SDAP) layer, and a packet data convergence protocol (PDCP) layer of the base station.

8. The wireless device of claim 7, wherein a cycle of the paging is determined based on the paging DRX information.

9. The wireless device of claim 7, wherein the paging information further includes at least one of a user equipment (UE) identity index value, a UE paging identity, a list of tracking area identities (TAIs), UE radio capability for paging, assistance data for paging and/or an extended UE identity index value.

* * * * *